United States Patent
Suzuki et al.

(10) Patent No.: US 8,738,881 B2
(45) Date of Patent: May 27, 2014

(54) PERFORMANCE OPTIMIZATION SYSTEM, METHOD AND PROGRAM

(75) Inventors: Noriaki Suzuki, Tokyo (JP); Sunao Torii, Tokyo (JP); Junji Sakai, Kanagawa (JP)

(73) Assignee: NEC Corporation, Tokyo (JP)

( * ) Notice: Subject to any disclaimer, the term of this patent is extended or adjusted under 35 U.S.C. 154(b) by 957 days.

(21) Appl. No.: 12/865,781

(22) PCT Filed: Feb. 6, 2009

(86) PCT No.: PCT/JP2009/052041
§ 371 (c)(1),
(2), (4) Date: Aug. 2, 2010

(87) PCT Pub. No.: WO2009/101900
PCT Pub. Date: Aug. 20, 2009

(65) Prior Publication Data
US 2010/0332709 A1    Dec. 30, 2010

(30) Foreign Application Priority Data

Feb. 13, 2008 (JP) ................................. 2008-031728

(51) Int. Cl.
G06F 12/08 (2006.01)
G06F 3/06 (2006.01)

(52) U.S. Cl.
CPC .......... G06F 3/0644 (2013.01); *G06F 12/0802* (2013.01)
USPC ........... 711/170; 711/162; 711/173; 711/167; 711/E12.016; 710/240

(58) Field of Classification Search
CPC .......................... G06F 12/0802; G06F 3/0644
USPC .......... 711/152, E12.016, 112, 161, 170, 173, 711/162, 167; 710/240
See application file for complete search history.

(56) References Cited

U.S. PATENT DOCUMENTS

| | | | | |
|---|---|---|---|---|
| 6,249,906 B1 * | 6/2001 | Levine et al. | ................. | 717/153 |
| 6,487,557 B1 * | 11/2002 | Nagatomo | ............................ | 1/1 |
| 8,200,902 B2 * | 6/2012 | Paver et al. | ................... | 711/133 |

FOREIGN PATENT DOCUMENTS

| JP | 6-324957 A | 11/1994 |
|---|---|---|
| JP | 7-253915 A | 10/1995 |

(Continued)

OTHER PUBLICATIONS

International Search Report for PCT/JP2009/052041 mailed Mar. 24, 2009.

*Primary Examiner* — Pierre-Michel Bataille
(74) *Attorney, Agent, or Firm* — Sughrue Mion, PLLC

(57) ABSTRACT

Provided is a performance optimization system that can identify a case where the impact on performance is large even when the number of cache misses is small. The performance optimization system includes: a required-period-of-time measurement unit that measures a required period of time concerning a to-be-observed access; a required-period-of-time table holding unit that holds a required-period-of-time table that consists of a plurality of table entries in which stored are measured values of the required period of time for each of classification regions produced by dividing a memory region for each of types based on the to-be-observed access to store a measured value of the required period of time; a table entry selection unit that makes a selection as to in which table entry, out of a plurality of table entries for each of the classification regions that make up the required-period-of-time table, the measured value of the required period of time is stored on the basis of the to-be-observed access; and a cache miss observation unit that detects the occurrence of a cache miss associated with the to-be-observed access.

10 Claims, 13 Drawing Sheets

(56) References Cited

FOREIGN PATENT DOCUMENTS

| JP | 9-101906 A | 4/1997 |
|---|---|---|
| JP | 9-198275 A | 7/1997 |
| JP | 9-274589 A | 10/1997 |
| JP | 2000057189 A | 2/2000 |
| JP | 2000339219 A | 12/2000 |
| JP | 2007206806 A | 8/2007 |

* cited by examiner

PERFORMANCE OPTIMIZATION SYSTEM, METHOD AND PROGRAM

TECHNICAL FIELD

The present invention relates to a performance optimization system, method and program and particularly to a performance optimization system and performance optimization method able to collect and analyze required-period-of-time information about penalties caused by a cache miss.

A cache memory used in processors such as MPU (Micro Processing Unit) includes a pair of memories (referred to as a "cache line"), which are a tag memory and a data memory. The cache line is selected with the use of a portion of an address (referred to as "index") (see PTL (Patent Literature) 1, for example). Accordingly, when a memory access occurs to a given address from a processor, a specific cache line of a cache memory is determined by the index of the address and data is read from the tag and data memories of the cache line. The data read from the tag memory is compared with data of high-order bits in the address of the memory access. When both data items are identical as a result, the data of the corresponding cache line is regarded as valid (referred to as a "cache hit") and the data of the data memory is transferred to the processor. When both data items are different, the data of the corresponding cache line is regarded as invalid (referred to as a "cache miss").

If it is possible to acquire the address of the memory access and cache miss information, then it is possible to figure out in which portion of a program a cache miss has occurred. Optimizing the portion of the program leads to an improvement in the performance of the processor.

What is disclosed in PTL 1 is one example of such a performance optimization system: a cache observation device, a method of analyzing a processor and a cache memory for acquiring data that is instrumental in optimizing programs with a relatively small circuit added. FIG. 13 shows the configuration thereof.

As shown in FIG. 13, the performance optimization system disclosed in PTL 1 includes a cache miss determination unit e1, an entry region determination unit e2, and a number-of-cache-misses counting unit e10.

The following describes the operation of the performance optimization system having the above configuration. That is, when access to a cache memory e3 occurs, the cache miss determination unit e1 makes a determination as to whether a cache miss has occurred. The entry region determination unit e2 uses a portion of the index that is a portion of the address specifying a cache line of the cache memory e3 to make a determination as to which cache entry region of the cache memory e3 is accessed when the cache miss access has occurred. The number-of-cache-misses counting unit e10 counts the number of cache miss accesses for each cache entry region specified by the entry region determination unit e2.

It is understood that it is possible for the above performance optimization system to measure how many cache misses have occurred in which area of the cache entry region divided, and that the use of index distribution, as well as the relatively small circuit added, makes it possible to acquire the data in an efficient manner that is instrumental in optimizing programs.

CITATION LIST

Patent Literature

{PTL 1} JP-A-2007-206806

SUMMARY OF INVENTION

Technical Problem

However, there are the following problems with the performance optimization system disclosed in PTL 1.

The first problem is that even though the number of cache misses is small, it is impossible to identify a case where the impact on performance is large. The reason is that it is impossible to measure the length of a required period of time such as access delay and latency.

The second problem is that when it is impossible to make modifications to the periphery of a cache memory because a processor such as a MPU consisting of a MPU core, a cache memory and other components (a central processing unit, a data processing unit or the like) is supplied from an outside supplier, it is impossible to observe cache misses. The reason is that what is adopted is a method of determining a cache miss access at a time when the cache memory is accessed and it is necessary to observe signals of the periphery of the cache memory.

The third problem is that it is impossible to figure out the effects of other conflicting bus masters on performance. The reason is that it is impossible to distinguish the latency caused by the arbitration of the bus from genuine access delays.

Another problem is that since a table entry is formed for each cache entry region in the performance optimization system disclosed in PTL 1, data of a plurality of portions of a memory is input into the cache entries. Therefore, it is difficult to distinguish when penalties caused by a cache miss and the like are significantly different depending on regions at a time when a plurality of the regions is accessed.

The object of the present invention is to solve the above problems and provide a performance optimization system that can identify a case where the impact on performance is large even when the number of cache misses is small.

Solution to Problem

To achieve the above object, a first performance optimization system of the present invention includes: a required-period-of-time measurement unit that measures a required period of time concerning a to-be-observed access; a required-period-of-time table holding unit that holds a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID (identifier); a table entry selection unit configured to select, on the basis of the to-be-observed access, among the plurality of table entries a table entry in which the measured value of the number of accesses and the measured value of the required period of time are stored; and a cache miss observation unit that detects the occurrence of a cache miss associated with the to-be-observed access.

A second performance optimization system of the present invention includes: a required-period-of-time measurement unit that measures a required period of time concerning a to-be-observed access; a required-period-of-time table holding unit that holds a required-period-of-time table that consists of a plurality of table entries in which stored are measured values of the required period of time for each of classification regions produced by dividing a memory region for each of types based on the to-be-observed access; a table entry selection unit that makes a selection as to in which table entry, out of a plurality of table entries for each of the classification regions that make up the required-period-of-time table, a measured value of the required period of time is stored on the basis of the to-be-observed access; and a bus access observation unit that detects the occurrence of a bus access associated with the to-be-observed access.

A first performance optimization method of the present invention includes the steps of: detecting the occurrence of a cache miss access associated with a to-be-observed access; starting to measure a required period of time concerning the access; selecting a table entry from a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID (identifier); detecting the completion of the cache miss access; stopping the measurement of the required period of time concerning the access; and updating the selected table entry, out of a plurality of table entries that make up the required-period-of-time table, with the use of a value of a number of accesses and the measured value of the required period of time from when the cache miss access occurs until the cache miss access ends.

A second performance optimization method of the present invention includes the steps of: detecting the occurrence of a bus access associated with a to-be-observed access; starting to measure a required period of time concerning the access; selecting a table entry from a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID (identifier); detecting the completion of the bus access; stopping the measurement of the required period of time concerning the access; and updating the selected table entry, out of a plurality of table entries that make up the required-period-of-time table, with the use of a value of a number of accesses and the measured value of the required period of time from when the bus access occurs until the bus access ends.

A first performance optimization program of the present invention causes a computer to execute: a process of detecting the occurrence of a cache miss access associated with a to-be-observed access; a process of starting to measure a required period of time concerning the access; a process of selecting a table entry from a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID identifier; a process of detecting the completion of the cache miss access; a process of stopping the measurement of the required period of time concerning the access; and a process of updating the selected table entry, out of a plurality of table entries that make up the required-period-of-time table, with the use of a value of a number of accesses and the measured value of the required period of time from when the cache miss access occurs until the cache miss access ends.

A second performance optimization program of the present invention causes a computer to execute: a process of detecting the occurrence of a bus access associated with a to-be-observed access; a process of starting to measure a required period of time concerning the access; a process of selecting a table entry from a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID (identifier); a process of detecting the completion of the bus access; a process of stopping the measurement of the required period of time concerning the access; and a process of updating the selected table entry, out of a plurality of table entries that make up the required-period-of-time table, with the use of a value of a number of accesses and the measured value of the required period of time from when the bus access occurs until the bus access ends.

Advantageous Effects of Invention

According to the present invention, it is possible to provide a performance optimization system that can identify a case where the impact on performance is large even when the number of cache misses is small.

REFERENCE SIGNS LIST

Figure 1:
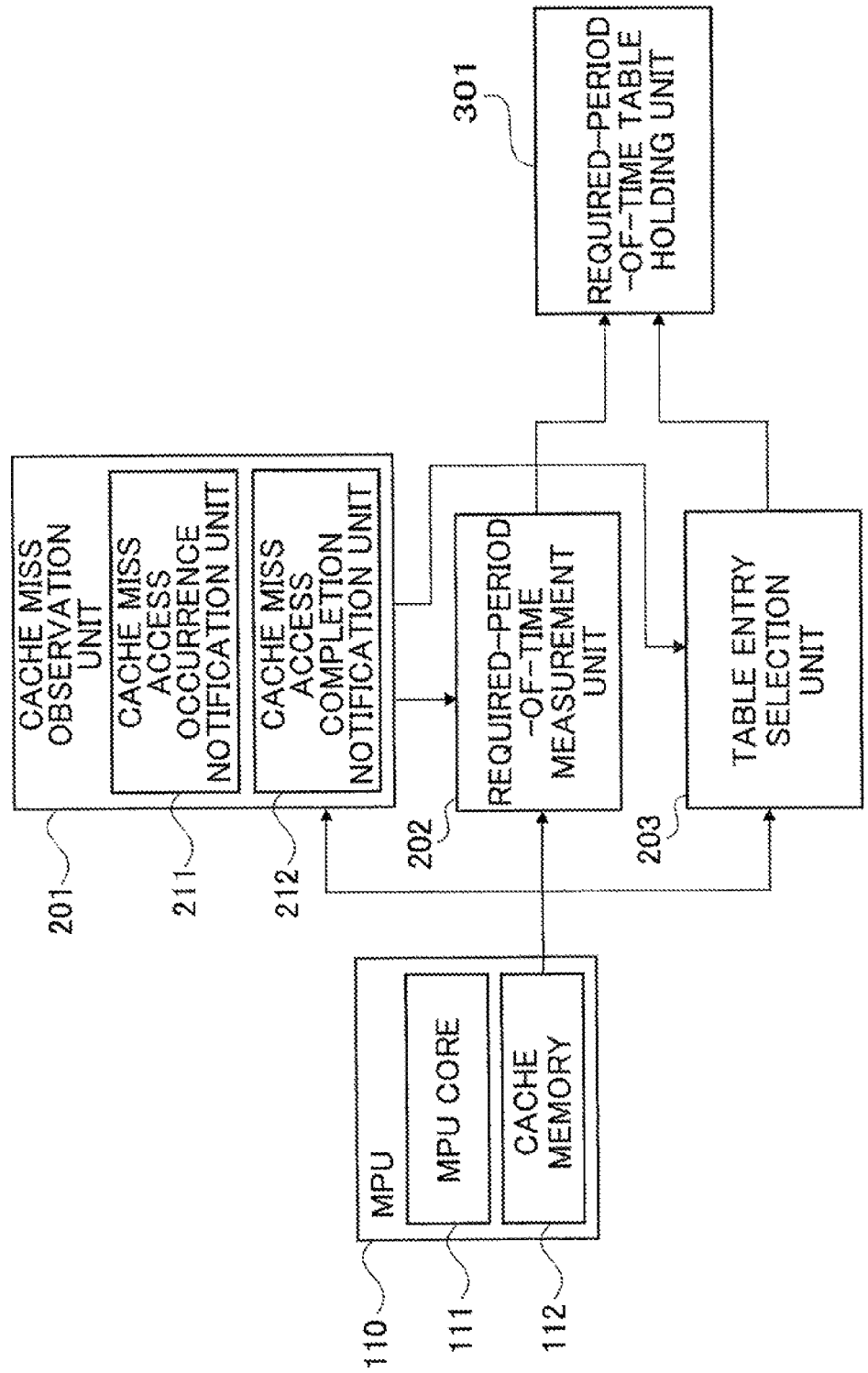
FIG. 1 A block diagram illustrating the configuration of a performance optimization system according to Example 1 of the present invention.

100: Bus master
110: MPU (Central processing unit; Processor; Data processing unit)
111: MPU core
112: Cache memory
120: Peripheral circuit
130: Bus arbiter
201: Cache miss observation unit
202: Required-period-of-time measurement unit
203: Table entry selection unit
204: Bus access observation unit
205: Bus arbitration observation unit
206: Bus arbitration period measurement unit
207: Cache miss observation unit
211: Cache miss access occurrence notification unit
212: Cache miss access completion notification unit
213: Number-of-accesses table updating unit
221: Bus access occurrence notification unit
222: Bus access completion notification unit
223: Access type determination unit
301: Required-period-of-time table holding unit
302: Number-of-accesses table holding unit
303: Bus arbitration period table holding unit
401: Access delay cycle measurement counter
402: Bus arbitration cycle measurement counter
403: Address generator
404: Setting register
405: Entry updating unit
406: AND circuit
410: Table memory
420: Buss access observing unit
411: Entry (Table entry)
412: Number-of-accesses holding section
413: Access delay holding section
414: Number-of-bus-arbitration-cycles holding section
421: Access filter

DESCRIPTION OF EMBODIMENTS

The following describes in detail performance optimization systems, methods and programs according to exemplary embodiments of the present invention with reference to the accompanying drawings.

First Exemplary Embodiment

According to a first exemplary embodiment of the present invention, a performance optimization system includes a required-period-of-time measurement unit, a table entry selection unit, a required-period-of-time table holding unit, and a cache miss observation unit. The following describes the operations of the above units. The cache miss observation unit detects the occurrence of a cache miss. The required-period-of-time measurement unit measures a required period of time such as access delays caused by cache misses and latency. The table entry selection unit sorts out cache miss accesses by classification region that is based on access such as an address value of the to-be-observed access and uses a value of the required period of time measured by the required-period-of-time measurement unit to update the corresponding table entry of the required-period-of-time table holding unit corresponding to the classification region sorted out.

Since the above configuration is employed to measure the magnitude of the impact on performance, it is possible to provide the performance optimization system that can identify a case where the impact on performance is large even when the number of cache misses is small.

Second Exemplary Embodiment

According to a second exemplary embodiment of the present invention, a performance optimization system includes a required-period-of-time measurement unit, a table entry selection unit, a required-period-of-time table holding unit, and a bus access observation unit. The following describes the operations of the above units. The bus access observation unit detects a bus access. The required-period-of-time measurement unit measures a required period of time such as access delays caused by cache misses and latency. The table entry selection unit sorts out by classification region that is based on access such as access type to classify cache miss accesses and other accesses and uses a value of the required period of time measured by the required-period-of-time measurement unit to update the corresponding table entry of the required-period-of-time table holding unit corresponding to the classification region sorted out.

Since the above configuration is employed to observe from outside a processor such as a MPU consisting of a MPU core, a cache memory and other components (a central processing unit, a data processing unit or the like), it is possible to provide the performance optimization system that can identify a case where the impact on performance is large even when the number of cache misses is small as well as observe cache misses even when it is impossible to make modifications because the MPU core, the cache memory and the like are those supplied from outside a company.

Third Exemplary Embodiment

According to a third exemplary embodiment of the present invention, a performance optimization system includes a required-period-of-time measurement unit, a table entry selection unit, a required-period-of-time table holding unit, a bus access observation unit, a bus arbitration observation unit, a bus arbitration period measurement unit, and a bus arbitration period table holding unit. The following describes the operations of the above units. The bus access observation unit detects a buss access. The required-period-of-time measurement unit measures a required period of time such as access delays and latency. The bus arbitration observation unit detects bus arbitration. The bus arbitration period measurement unit measures a required period of time such as latency associated with bus arbitration. The table entry selection unit sorts out bus accesses by classification region that is based on access such as an address value of the to-be-observed access and uses a value of the required period of time measured by the required-period-of-time measurement unit to update the corresponding table entry of the required-period-of-time table holding unit corresponding to the classification region sorted out. The table entry selection unit also uses a value of the required period of time measured by the bus arbitration period measurement unit to update the corresponding table entry of the bus arbitration period table holding unit corresponding to the above classification region sorted out.

Since the above configuration is employed to observe both the required period of time such as access delays and latency and the bus arbitration period that is a portion of the required period the latency associated with bus arbitration and the like account for, it is possible to provide the performance optimization system that can identify a case where the impact on performance is large even when the number of cache misses is small as well as figure out the effects of other conflicting bus masters on performance.

According to the above first to third exemplary embodiments, the following effects can be obtained.

The first effect is to be able to identify a case where the impact on performance is large even when the number of cache misses is small. The reason is that it is possible to measure the impact of the required period of time, such as the number of waiting cycles caused by each cache miss, by means of the required-period-of-time measurement unit and the required-period-of-time table holding unit and to identify a case where the impact on performance is large even when the number of cache misses is small.

The second effect is to be able to observe cache misses even when it is impossible to make modifications because of the MPU core, the cache memory and the like supplied from outside a company. The reason is that according to the present method, it is possible for the bus access observation unit and the table entry selection unit to distinguish a cache miss access flowing through a bus positioned outside the MPU core, the cache memory and the like from other accesses to observe.

The third effect is to be able to figure out the effects of other bus masters. The reason is that it is possible for the bus arbitration observation unit, the bus arbitration period measurement unit and the bus arbitration period table holding unit to distinguish the latency caused by the arbitration of the bus from other kinds of latency.

The following describes in detail examples of the present invention with reference to the accompanying drawings.

Example 1

With reference to FIG. 1, in Example 1 of the present invention, a performance optimization system is connected to a MPU (including a central processing unit, processor, data processing unit or the like) 100 that contains a MPU core 111 and a cache memory 112. The performance optimization system includes a required-period-of-time measurement unit 202, a table entry selection unit 203, a required-period-of-time table holding unit 301, and a cache miss observation unit 201. In this case, the cache miss observation unit 201 includes a cache miss access occurrence notification unit 211 and a cache miss access completion notification unit 212. In general, each of the above units works as follows.

The required-period-of-time measurement unit 202 measures a required period of time such as access delays and latency.

The table entry selection unit 203 uses one or a combination of the following factors to make a selection as to in which table entry of a required-period-of-time table held by the required-period-of-time table holding unit 301 the measurement result of the required period (a measured value) is stored: an address value of the to-be-observed access, an access type concerning whether the access is for writing or reading, the duration of burst access and the like, an access ID (identifier), and the like.

The required-period-of-time table holding unit 301 holds the required-period-of-time table that is made up of a plurality of table entries in which stored are required-period-of-time values of individual regions that the table entry selection unit 203 has classified.

The cache miss observation unit 201 is equipped with a function of detecting the occurrence of a cache miss, a function of notifying the occurrence of a cache miss access by means of the internal cache miss access occurrence notification unit 211, a function of detecting the completion of a cache miss access to the bus caused by a cache miss, and a function of notifying the completion of the cache miss access by means of the internal cache miss access completion notification unit 212.

Figure 2:
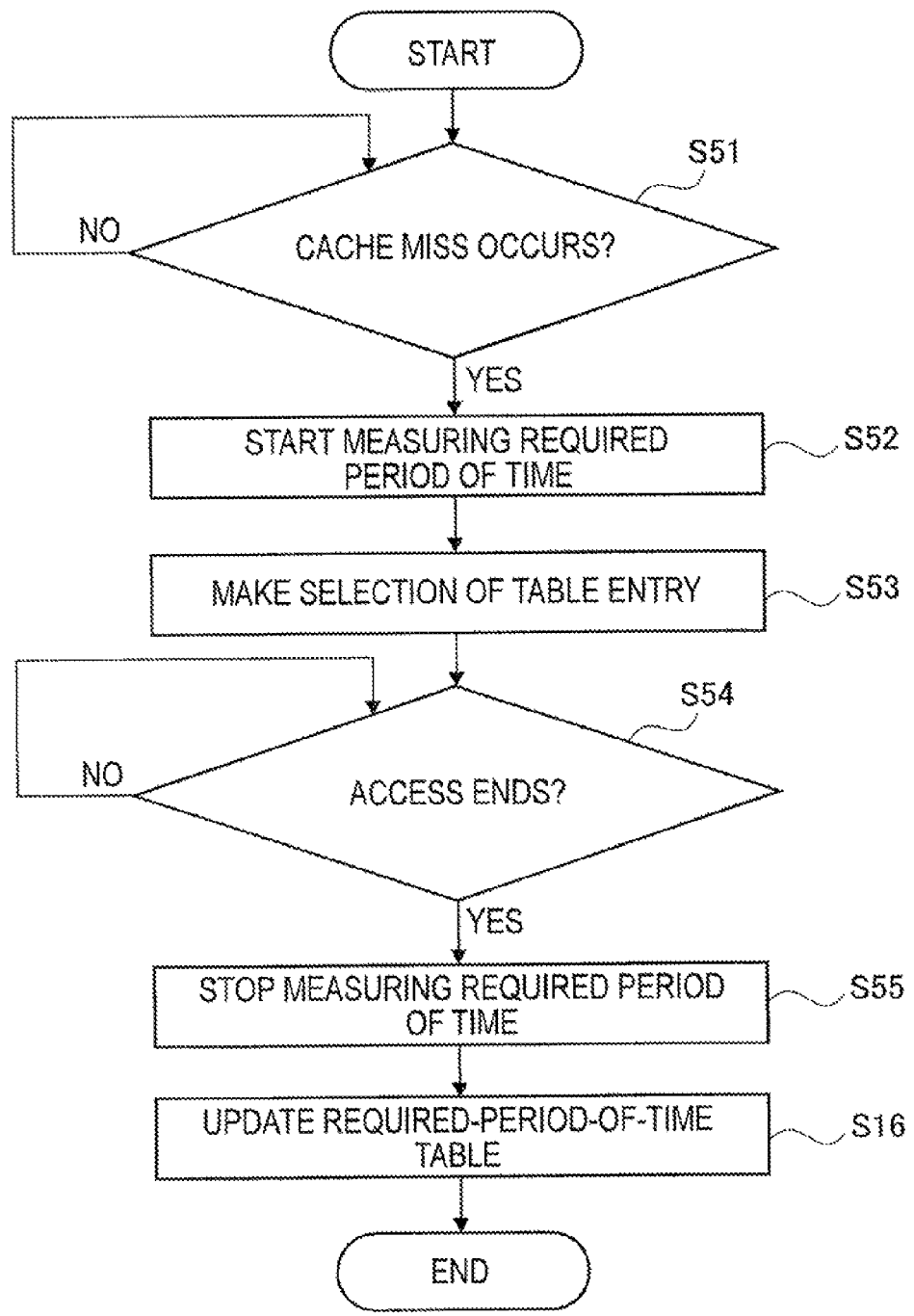
FIG. 2 A flowchart illustrating the operation of the performance optimization system according to Example 1.

The following describes in detail the overall operation of the present example with reference to a flowchart of FIG. 2.

First, the cache miss observation unit 201 continuously observes access to the cache memory 112 in the MPU 100 (Step S11: No). When the occurrence of a cache miss is detected as a result (Step S11: Yes), the cache miss observation unit 201 uses the internal cache miss access occurrence notification unit 211 to notify the required-period-of-time measurement unit 202 and the table entry selection unit 203 of the occurrence of access.

Then, after the required-period-of-time measurement unit 202 is notified of the occurrence of access by the cache miss observation unit 201, the required-period-of-time measurement unit 202 starts to measure a required period of time (Step S12).

Moreover, after the table entry selection unit 203 is notified of the occurrence of access by the cache miss observation unit 201, the table entry selection unit 203 uses an address value of address information the table entry selection unit 203 has been notified of to make a selection as to which table entry result (required-period-of-time value) of the required-period-of-time table holding unit 301 to update (Step S13).

Meanwhile, the cache miss observation unit 201 continues monitoring the completion of a cache miss access to the bus caused by a cache miss (Step S14: No). When the cache miss access ends as a result (Step S14: Yes), the cache miss observation unit 201 uses the internal cache miss access completion notification unit 212 to notify the required-period-of-time measurement unit 202 of the completion of access.

After the required-period-of-time measurement unit 202 is notified of the completion of access by the cache miss observation unit 201, the required-period-of-time measurement unit 202 stops measuring the required period of time (Step S15).

Finally, the required-period-of-time measurement unit 202 updates the table entry of the required-period-of-time table holding unit 301 (Step S16). The table entry to be updated is the one selected by the table entry selection unit 203.

Incidentally, as for the selection of a table entry at step S13, the selection can be made regardless of the order illustrated as long as the selection is performed during a period from when the access is detected at step S11 to when the required-period-of-time table is updated at step S16.

The following describes the advantageous effects of the present example.

In the present example, the configuration enables the required-period-of-time measurement unit 202 and the required-period-of-time table holding unit 301 to measure the effects of the required period of time, such as the number of waiting cycles caused by each cache miss. Therefore, it is possible to identify a case where the impact on performance is large even when the number of cache misses is small.

Moreover, in the present example, the configuration enables the table entry selection unit 203 and the required-period-of-time table holding unit 301 to hold the value of the required period of time for each region classified based on access such as an address range, the contents of access and the like. Therefore, it is possible to identify in which region the access that affects performance considerably occurs.

Moreover, for example, unlike the above performance optimization system disclosed in PTL 1 where a table entry is formed for each cache entry region, an original memory region is divided and a table entry is formed for each of regions created by division for measurement in the present example Therefore, one of the advantages is that when access occurs to a plurality of regions in a memory, it is easy to distinguish even when penalties caused by a cache miss and the like are significantly different depending on which regions are accessed.

Example 2

The following describes in detail Example 2 of the present invention with reference to the accompanying drawings.

Figure 3:
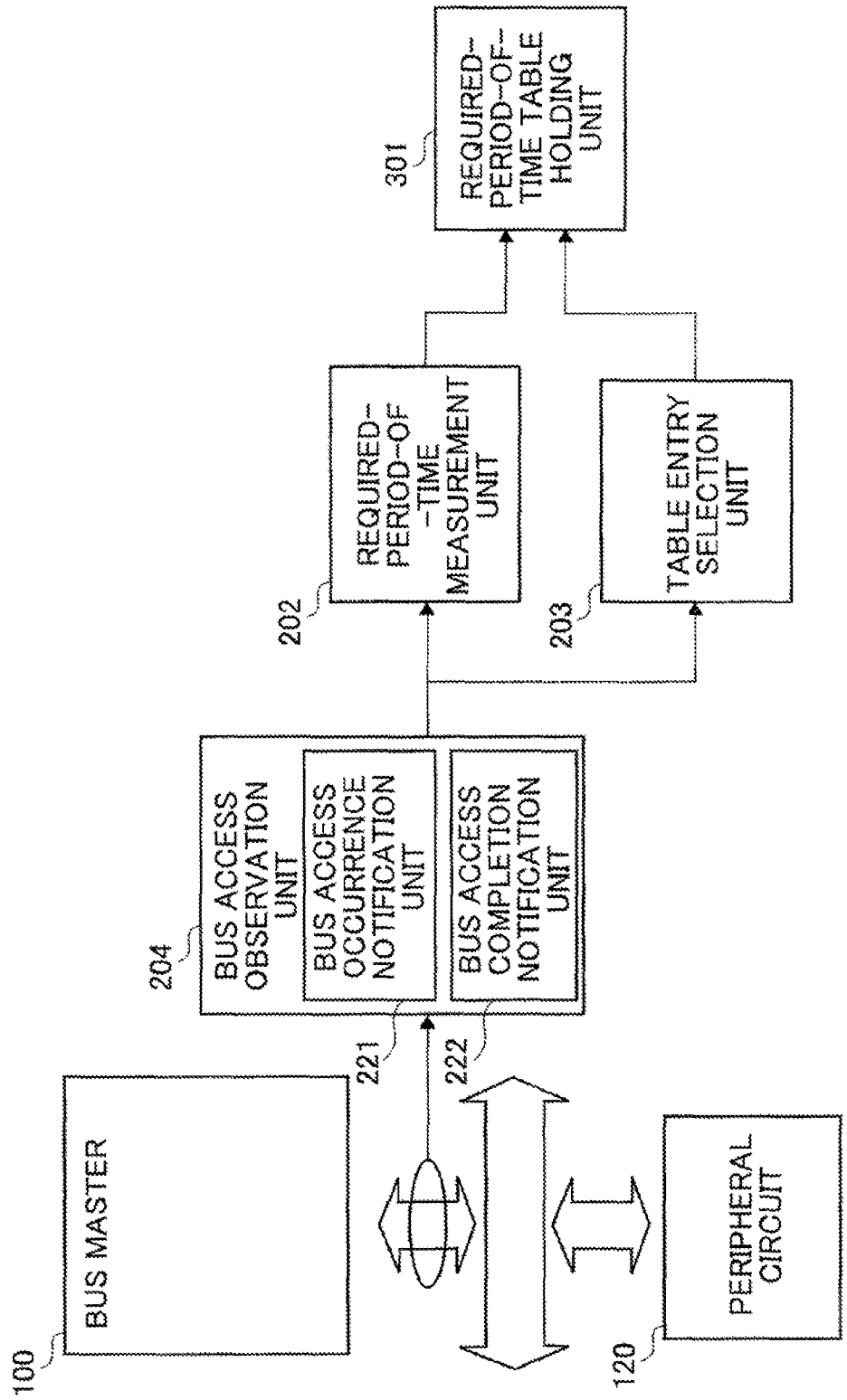
FIG. 3 A block diagram illustrating the configuration of a performance optimization system according to Example 2 of the present invention.

With reference to FIG. 3, in the present example, a performance optimization system is connected to a bus master 100 and peripheral circuit 120 positioned outside a MPU core, a cache memory and the like. The performance optimization system includes a required-period-of-time measurement unit 202, a table entry selection unit 203, a required-period-of-time table holding unit 301, and a buss access observation unit 204. In this case, the buss access observation unit 204 includes a bus access occurrence notification unit 221 and a bus access completion notification unit 222. In general, each of the above units works as follows.

The required-period-of-time measurement unit 202 measures a required period of time such as access delays and latency.

The table entry selection unit 203 uses one or a combination of the following factors to make a selection as to in which table entry of a required-period-of-time table the measurement result of the required period is stored: an address value of the to-be-observed access, an access type concerning whether the access is for writing or reading, the duration of burst access and the like, an access ID, and the like.

The required-period-of-time table holding unit 301 holds the required-period-of-time table that is made up of a plurality of table entries in which stored are required-period-of-time values of individual regions that the table entry selection unit 203 has classified.

The buss access observation unit 204 is equipped with a function of detecting the occurrence of access to a bus, a function of notifying of the detected access by means of the internal bus access occurrence notification unit 221, a function of detecting the completion of the bus access, and a function of notifying of the completion of the bus access by means of the internal bus access completion notification unit 222.

Figure 4:
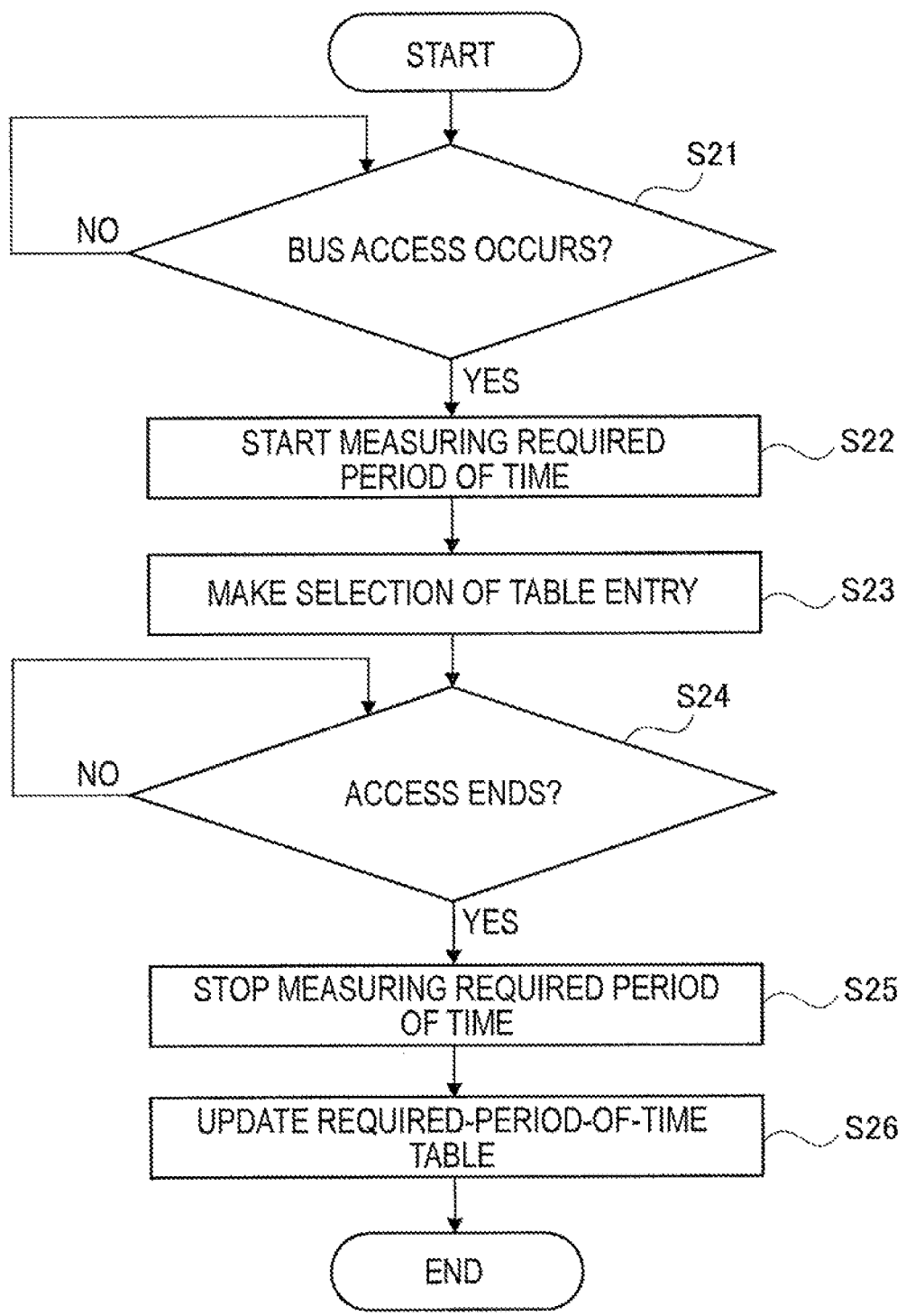
FIG. 4 A flowchart illustrating the operation of the performance optimization system according to Example 2.

The following describes in detail the overall operation of the present example with reference to a flowchart of FIG. 4.

First, the buss access observation unit 204 continuously observes the occurrence of access to the bus (Step S21: No). When the access is detected as a result (Step S21: Yes), the buss access observation unit 204 uses the internal bus access occurrence notification unit 221 to notify the required-period-of-time measurement unit 202 and the table entry selection unit 203 of the occurrence of access.

Then, after the required-period-of-time measurement unit 202 is notified of the occurrence of access by the buss access observation unit 204, the required-period-of-time measurement unit 202 starts to measure a required period of time (Step S22).

Moreover, after the table entry selection unit 203 is similarly notified of the occurrence of access by the buss access observation unit 204, the table entry selection unit 203 uses one or a combination of the following factors to make a selection as to which table entry result of the required-period-of-time table holding unit 301 to update (Step S23): an address value of address information the table entry selection unit 203 has been notified of, an access type concerning whether the access is for writing or reading, the duration of burst access and the like, an access ID, and the like.

Meanwhile, the buss access observation unit 204 continues monitoring the completion of the buss access (Step S24: No). When the bus access ends as a result (Step S24: Yes), the buss access observation unit 204 uses the internal bus access completion notification unit 222 to notify the required-period-of-time measurement unit 202 of the completion of access.

After the required-period-of-time measurement unit 202 is notified of the completion of access by the buss access observation unit 204, the required-period-of-time measurement unit 202 stops measuring the required period of time (Step S25).

Finally, the required-period-of-time measurement unit 202 updates the table entry of the required-period-of-time table holding unit 301 (Step S26). The table entry to be updated is the one selected by the table entry selection unit 203.

Incidentally, as for the selection of a table entry at step S23, the selection can be made regardless of the order illustrated as long as the selection is performed during a period from when the access is detected at step S21 to when the required-period-of-time table is updated at step S26.

The following describes the advantageous effects of the present example.

When a certain type of MPU or bus is used, a unique structure is used for cache miss access and different from those of other kinds of access. In the present example, the structure is as follows: the access flowing through the bus is observed by the buss access observation unit 204 that is positioned outside the MPU core, and the cache memory and the like, and the cache miss access and other kinds of access are separated by the table entry selection unit 203 before being stored. Therefore, it is possible to observe cache misses even when it is impossible to make modifications because of the MPU consisting of the MPU core, cache memory and other components supplied from outside a company and the like.

Moreover, in the present example, the cache miss observation unit 201 is replaced with the buss access observation unit 204, and the configuration enables a required period of time that is not associated with cache misses to be measured. Therefore, it is possible to observe the required period of time of the bus master of any components other than the MPU containing the cache, such as a DMA (Direct Memory Access) controller and other functional blocks.

Furthermore, in the present example, for a bus master of any components other than the MPU that appropriately uses a plurality of access types, it is possible to observe by sorting the impacts on performance by access type.

Example 3

The following describes in detail Example 3 of the present invention with reference to the accompanying drawings.

Figure 5:
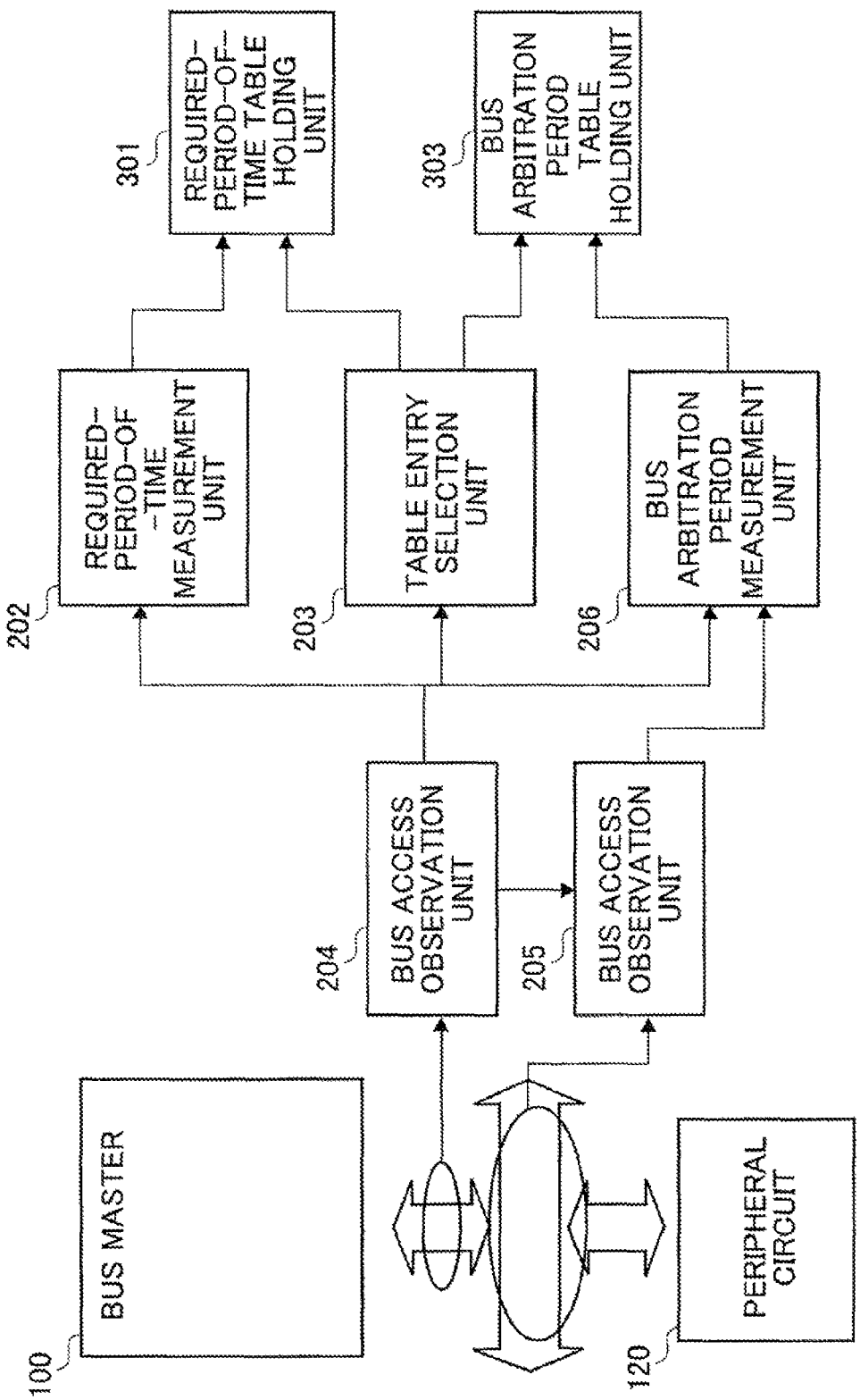
FIG. 5 A block diagram illustrating the configuration of a performance optimization system according to Example 3 of the present invention.

With reference to FIG. 5, in the present example, a performance optimization system is connected to a bus master 100 and peripheral circuit 120 positioned outside a MPU core, a cache memory and the like. The performance optimization system includes a required-period-of-time measurement unit 202, a table entry selection unit 203, a required-period-oftime table holding unit 301, a buss access observation unit 204, a bus arbitration observation unit 205, a bus arbitration period measurement unit 206, and a bus arbitration period table holding unit 303. In this case, the buss access observation unit 204 includes a bus access occurrence notification unit (not shown) and a bus access completion notification unit (not shown). In general, each of the above units works as follows.

The required-period-of-time measurement unit 202 measures a required period of time such as access delays and latency.

The table entry selection unit 203 uses one or a combination of the following factors to make a selection as to in which table entry of a required-period-of-time table the measurement result of the required period is stored: an address value of the to-be-observed access, an access type concerning whether the access is for writing or reading, the duration of burst access and the like, an access ID, and the like.

The required-period-of-time table holding unit 301 holds the required-period-of-time table that is made up of a plurality of table entries in which stored are required-period-of-time values of individual regions that the table entry selection unit 203 has classified.

The buss access observation unit 204 is equipped with a function of detecting the occurrence of access to a bus, a function of notifying of the detected access by means of the internal bus access occurrence notification unit (not shown), a function of detecting the completion of the bus access, and a function of notifying of the completion of the buss access by means of the internal bus access completion notification unit (not shown).

The bus arbitration observation unit 205 detects that a latency of arbitration has occurred due to a plurality of conflicting bus masters 100.

The bus arbitration period measurement unit 206 measures a period during which the latency of arbitration is occurring due to a plurality of conflicting bus masters 100. The bus conflicting time to be measured is equivalent to the number of cycles in which a bus controller that arbitrates an bus access right makes the bus master 100 to which the access right is not granted wait to access when a plurality of the bus masters 100 makes an access request to the bus.

The bus arbitration period table holding unit 303 holds a bus arbitration period table that is made up of a plurality of table entries in which stored are bus arbitration period values of individual regions that the table entry selection unit 203 has classified.

Figure 6:
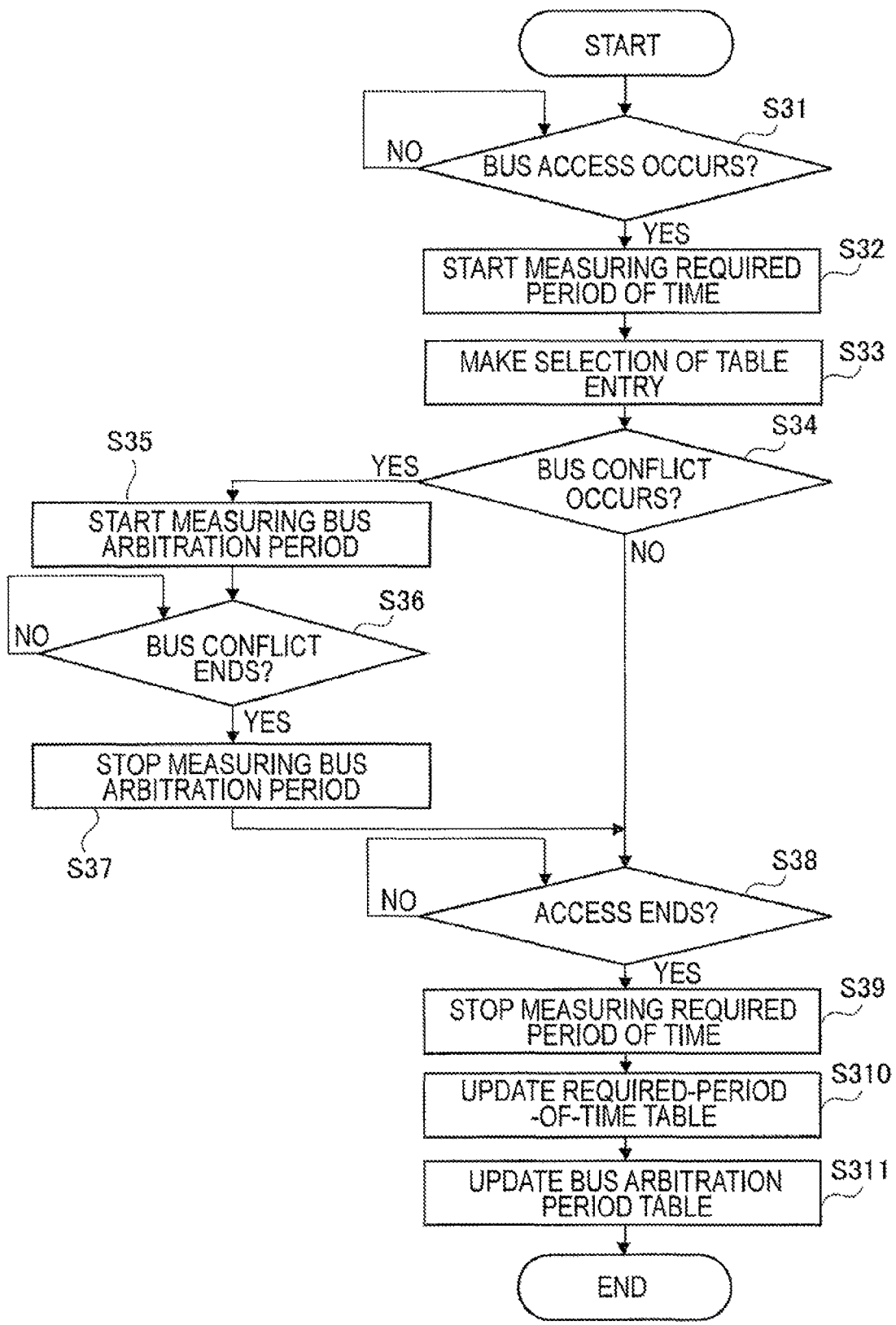
FIG. 6 A flowchart illustrating the operation of the performance optimization system according to Example 3.

The following describes in detail the overall operation of the present example with reference to a flowchart of FIG. 6.

First, the buss access observation unit 204 continuously observes the occurrence of access to the bus (Step S31: No). When the occurrence of access to the bus is detected as a result (Step S31: Yes), the buss access observation unit 204 uses the internal bus access occurrence notification unit (not shown) to notify the required-period-of-time measurement unit 202, the table entry selection unit 203 and the bus arbitration observation unit 205 of the occurrence of access.

Then, after the required-period-of-time measurement unit 202 is notified of the occurrence of access by the buss access observation unit 204, the required-period-of-time measurement unit 202 starts to measure a required period of time (Step S32).

Moreover, after the table entry selection unit 203 is similarly notified of the occurrence of access by the buss access observation unit 204, the table entry selection unit 203 uses one or a combination of the following factors to make a selection as to which table entry result of the required-period-of-time table holding unit 301 to update (Step S33): an address value of address information the table entry selection unit 203 has been notified of, an access type concerning whether the access is for writing or reading, the duration of burst access and the like, an access ID, and the like.

In this case, the bus arbitration observation unit 205 is similarly notified of the occurrence of access by the buss access observation unit 204. When the latency of arbitration associated with conflicting buses does not occur for the to-be-observed access (Step S34: No), the bus arbitration observation unit 205 proceeds to step S38 without doing anything. On the other hand, when the latency of arbitration associated with conflicting buses occurs for the to-be-observed access (Step S34: Yes), the bus arbitration observation unit 205 notifies the bus arbitration period measurement unit 206 of the fact that the latency of bus arbitration has occurred, and the bus arbitration period measurement unit 206 starts measuring a bus arbitration period (Step S35).

Then, the bus arbitration observation unit 205 continues observing the bus arbitration (Step S36: No). When the bus arbitration observation unit 205 detects that the latency of bus arbitration of the to-be-observed access ends as a result (Step S36: Yes), the bus arbitration observation unit 205 notifies the bus arbitration period measurement unit 206 of the fact that the latency of bus arbitration has ended. The bus arbitration period measurement unit 206 then stops measuring the bus arbitration period (Step S37).

In this case, the buss access observation unit 204 continues monitoring the completion of bus access (Step S33: No). When the bus access ends as a result (Step S38: Yes), the buss access observation unit 204 uses the internal bus access completion notification unit 222 to notify the required-period-of-time measurement unit 202 of the completion of access.

After the required-period-of-time measurement unit 202 is notified of the completion of access by the buss access observation unit 204, the required-period-of-time measurement unit 202 stops measuring the required period of time (Step S39).

Finally, the required-period-of-time measurement unit 202 and the bus arbitration period measurement unit 206 update the table entry of the required-period-of-time table holding unit 301 and the table entry of the bus arbitration period table holding unit 303, respectively (Steps S310 and S311). The table entry to be updated is the one selected by the table entry selection unit 203.

Incidentally, as for the selection of a table entry at step S33, the selection can be made regardless of the order illustrated as long as the selection is performed during a period from when the access is detected at step S31 to when the required-period-of-time table is updated at step S310.

As for the updating of the bus arbitration period table at step S310, if the table entry has already been selected, the updating can be done after the bus arbitration period measurement process ends at step S37 regardless of the order illustrated.

The following describes the advantageous effects of the present example.

In the present example, thanks to the bus arbitration observation unit, the bus arbitration period measurement unit and the bus arbitration period table holding unit, it is possible to distinguish the latency caused by the arbitration of the bus from other kinds of latency and to figure out the effects of other bus masters.

Example 4

The following describes in detail Example 4 of the present invention with reference to the accompanying drawings.

Figure 7:
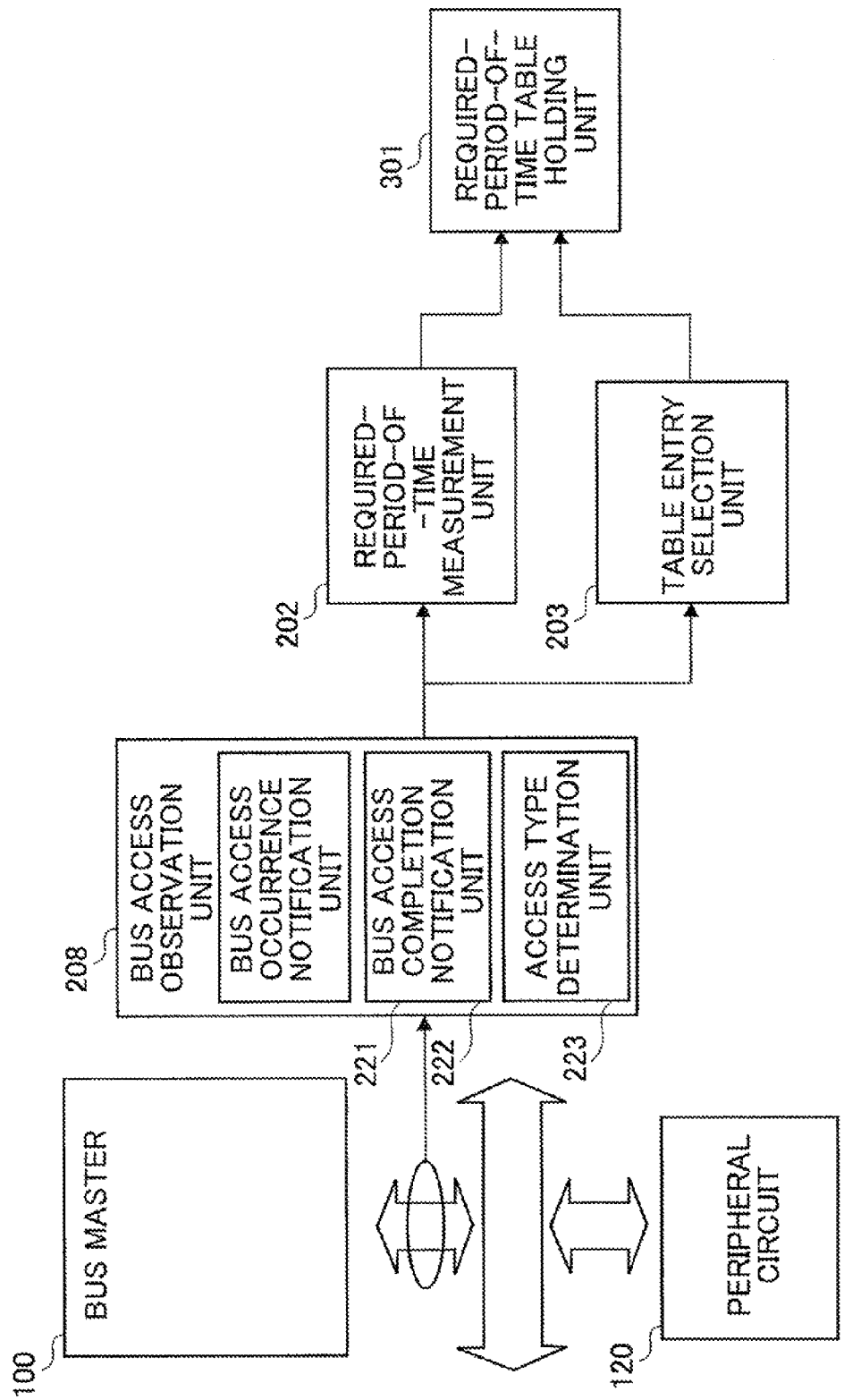
FIG. 7 A block diagram illustrating the configuration of a performance optimization system according to Example 4 of the present invention.

With reference to FIG. 7, in the present example, a performance optimization system is connected to a bus master 100 and peripheral circuit 120 positioned outside a MPU core, a cache memory and the like. The performance optimization system includes a required-period-of-time measurement unit 202, a table entry selection unit 203, a required-period-of-time table holding unit 301, and a buss access observation unit 208. In this case, the buss access observation unit 208 includes a bus access occurrence notification unit 211, a bus access completion notification unit 222, and an access type determination unit 223. In general, each of the above units works as follows.

The required-period-of-time measurement unit 202 measures a required period of time such as access delays and latency.

The table entry selection unit 203 uses one or a combination of the following factors to make a selection as to in which table entry of a required-period-of-time table the measurement result of the required period is stored: an address value of the to-be-observed access, an access type concerning whether the access is for writing or reading, the duration of burst access and the like, an access ID, and the like.

The required-period-of-time table holding unit 301 holds the required-period-of-time table that is made up of a plurality of table entries in which stored are required-period-of-time values of individual regions that the table entry selection unit 203 has classified.

The buss access observation unit 204 is equipped with a function of detecting the occurrence of access to a bus; a function of using the internal access type determination unit 223 to select an access that meets a specified arbitrary condition by using, out of the detected bus access information, information about an address value, an access type concerning whether the access is for writing or reading, the duration of burst access and the like, an access ID, and the like; a function of notifying the detected access by means of the internal bus access occurrence notification unit 211; a function of detecting the completion of the bus access; and a function of notifying the completion of the buss access by means of the internal bus access completion notification unit 222.

Figure 8:
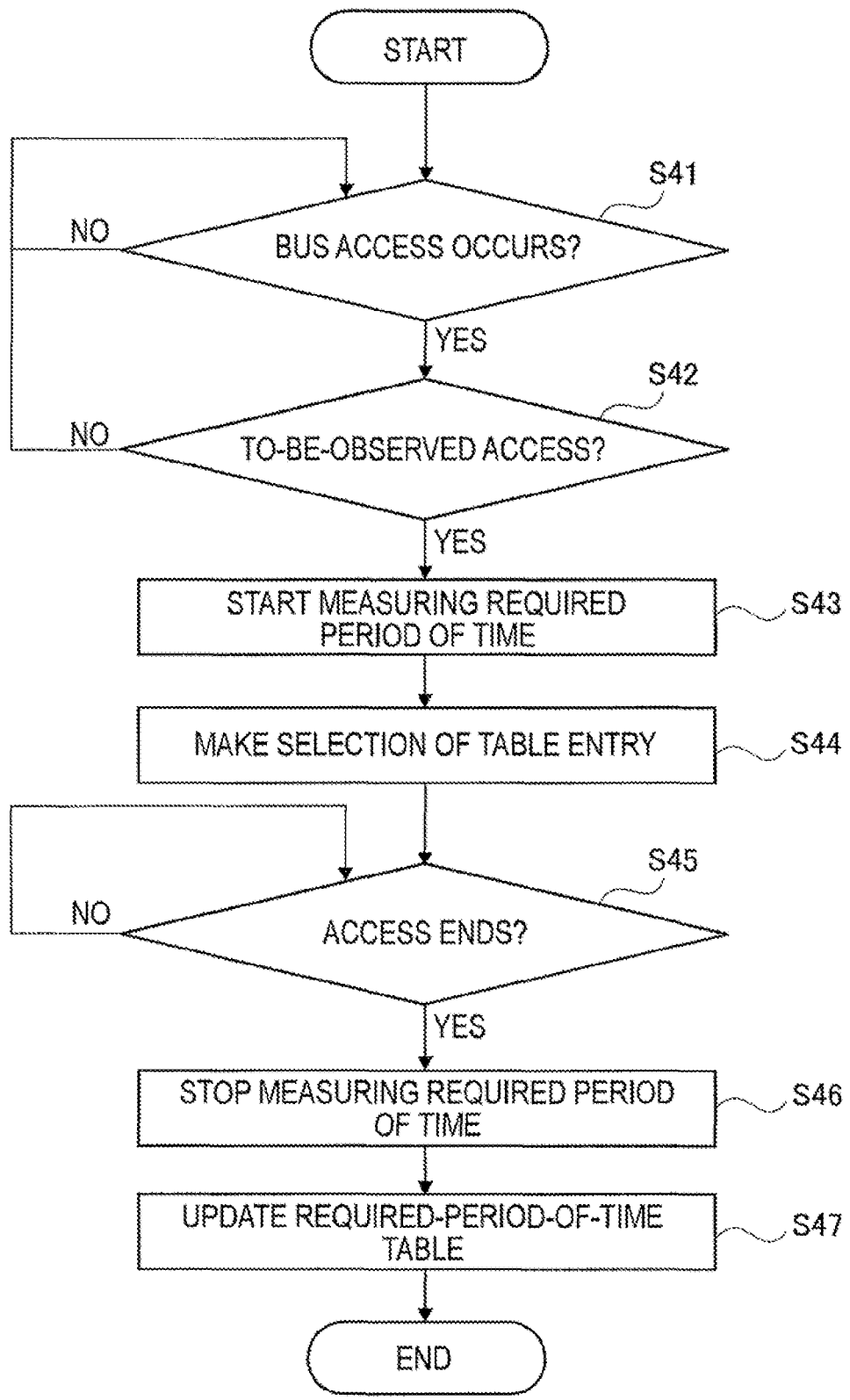
FIG. 8 A flowchart illustrating the operation of the performance optimization system according to Example 4.

The following describes in detail the overall operation of the present example with reference to a flowchart of FIG. 8.

First, the buss access observation unit 208 continuously observes the occurrence of access to the bus (Step S41: No). When the occurrence of access to the bus is detected as a result (Step S41: Yes), the buss access observation unit 208 activates the internal access type determination unit 223.

The access type determination unit 223 then makes a determination as to whether the detected bus access satisfies a specified arbitrary condition by using, out of the detected bus access information, information about an address value, an access type concerning whether the access is for writing or reading, the duration of burst access and the like, an access ID, and the like. When the detected buss access does not satisfy the condition as a result (Step S42: No), the process returns to step S41 to detect the next bus access. When the detected buss access satisfies the condition (Step S42: Yes), the buss access observation unit 208 uses the internal bus access occurrence notification unit 211 to notify the required-period-of-time measurement unit 202 and the table entry selection unit 203 of the fact that the satisfying access has occurred as an access occurrence notification.

Then, after the required-period-of-time measurement unit 202 is notified of the occurrence of access by the buss access observation unit 208, the required-period-of-time measurement unit 202 starts to measure a required period of time (Step S43).

Moreover, after the table entry selection unit 203 is similarly notified of the occurrence of access by the buss access observation unit 208, the table entry selection unit 203 uses one or a combination of the following factors to make a selection as to which table entry result of the required-period-of-time table holding unit 301 to update (Step S44): an address value of access information the table entry selection unit 203 has been notified of, an access type concerning whether the access is for writing or reading, the duration of burst access and the like, an access ID, and the like.

Meanwhile, the buss access observation unit 208 continues monitoring the completion of bus access (Step S45: No). When the bus access ends as a result (Step S45: Yes), the buss access observation unit 208 uses the internal bus access completion notification unit 222 to notify the required-period-of-time measurement unit 202 of the completion of access.

After the required-period-of-time measurement unit 202 is notified of the completion of access by the buss access observation unit 208, the required-period-of-time measurement unit 202 stops measuring the required period of time (Step S46).

Finally, the required-period-of-time measurement unit 202 updates the table entry of the required-period-of-time table holding unit 301 (Step S47). The table entry to be updated is the one selected by the table entry selection unit 203.

Incidentally, as for the selection of a table entry at step S44, the selection can be made regardless of the order illustrated as long as the selection is performed during a period from when the access is detected at step S41 to when the required-period-of-time table is updated at step S47.

The following describes the advantageous effects of the present example.

In the present example, the access type determination unit is provided in the bus access observation unit. The configuration makes it possible to observe with a limited number of to-be-observed accesses. Therefore, it is possible to eliminate accesses that need not to be observed and reduce the capacity of the required-period-of-time table holding unit.

Example 5

The following describes in detail Example 5 of the present invention with reference to the accompanying drawings.

Figure 9:
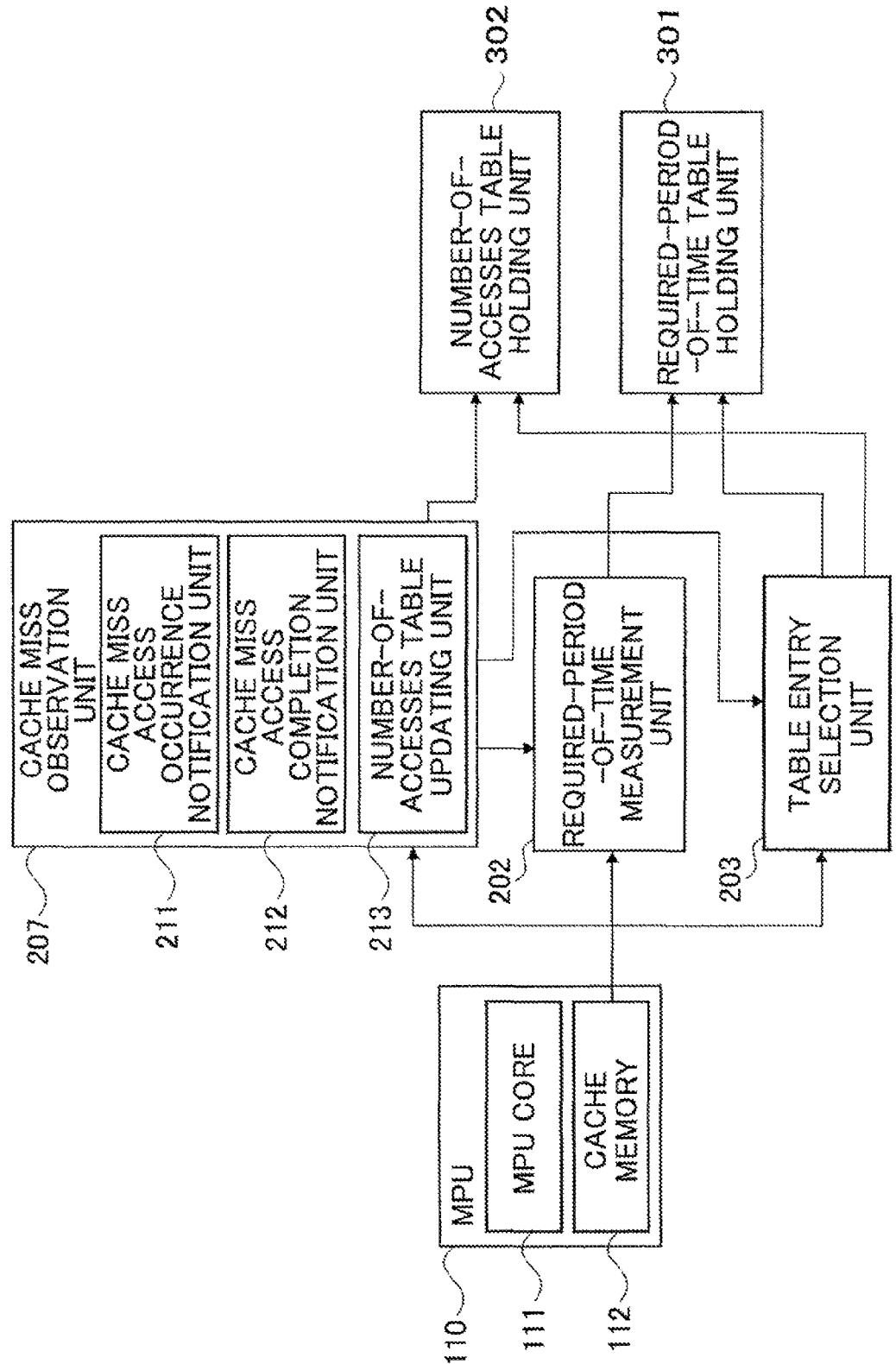
FIG. 9 A block diagram illustrating the configuration of a performance optimization system according to Example 5 of the present invention.

With reference to FIG. 9, in the present example, a performance optimization system is connected to a MPU 110 including a MPU core 111 and a cache memory 112. The performance optimization system includes a required-period-of-time measurement unit 202, a table entry selection unit 203, a required-period-of-time table holding unit 301, a cache miss observation unit 207, and a number-of-accesses table holding unit 302. In general, each of the above units works as follows.

The required-period-of-time measurement unit 202 measures a required period of time such as access delays and latency.

The table entry selection unit 203 uses one or a combination of the following factors to make a selection as to in which table entry of a required-period-of-time table the measurement result of the required period is stored: an address value of the to-be-observed access, an access type concerning whether the access is for writing or reading, the duration of burst access and the like, an access ID, and the like.

The required-period-of-time table holding unit 301 holds the required-period-of-time table that is made up of a plurality of table entries in which stored are required-period-of-time values of individual regions that the table entry selection unit 203 has classified.

The cache miss observation unit 207 is equipped with a function of detecting the occurrence of a cache miss, a function of notifying the occurrence of a cache miss access by means of an internal cache miss access occurrence notification unit 211, a function of detecting the completion of a cache miss access to the bus caused by a cache miss, and a function of notifying the completion of the cache miss access by means of an internal cache miss access completion notification unit 212, and a function of updating a number-of-accesses table held by the number-of-accesses table holding unit 302 by means of an internal number-of-accesses table updating unit 213.

The number-of-accesses table holding unit 302 holds a number-of-accesses table that is made up of a plurality of entries in which stored is the number of accesses for individual regions that the table entry selection unit 203 has classified.

Figure 10:
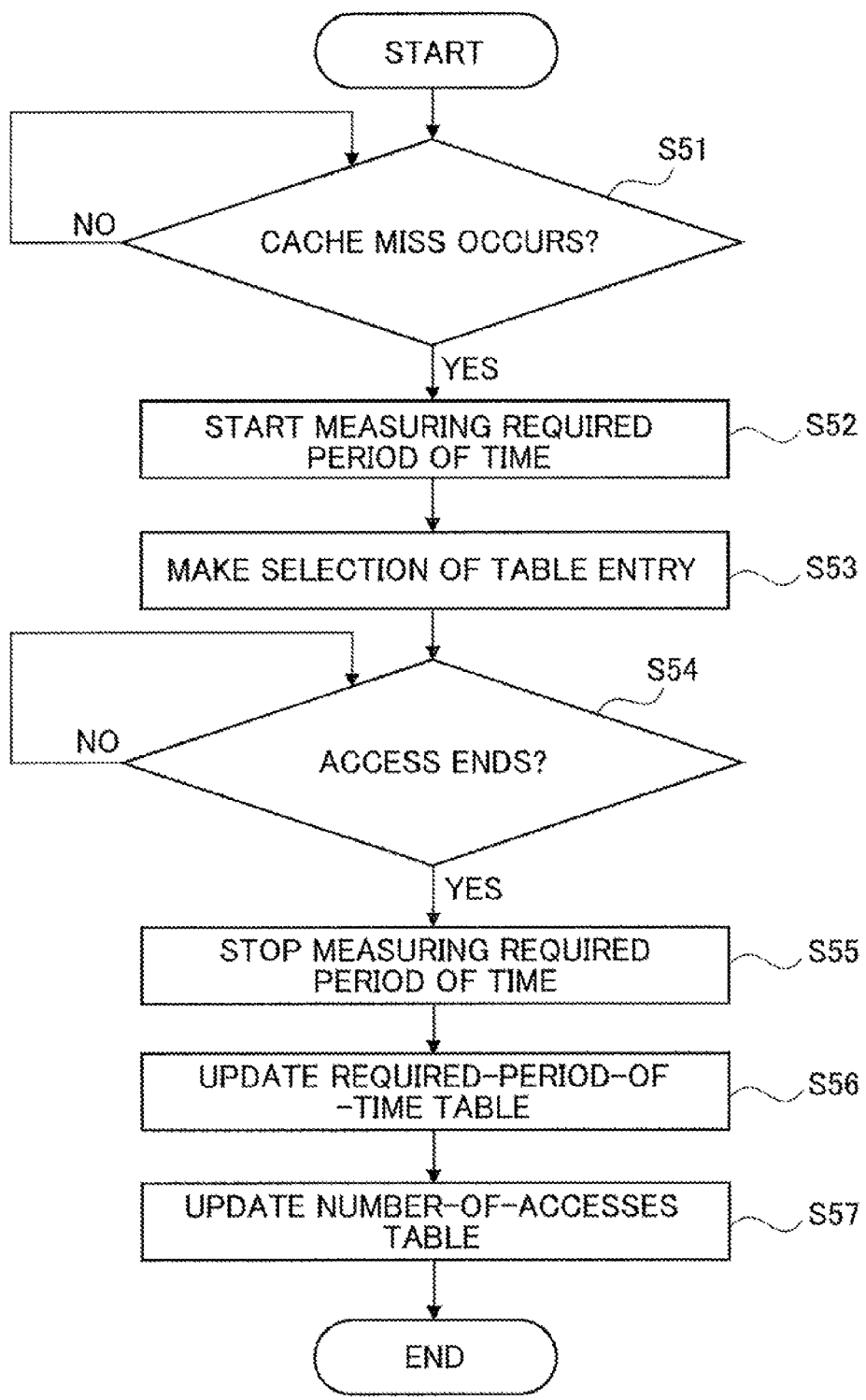
FIG. 10 A flowchart illustrating the operation of the performance optimization system according to Example 5.

The following describes in detail the overall operation of the present example with reference to a flowchart of FIG. 10.

First, the cache miss observation unit 207 continuously observes access to the cache memory 112 (Step S51: No). When the occurrence of a cache miss is detected as a result (Step S51: Yes), the cache miss observation unit 207 uses the internal cache miss access occurrence notification unit 211 to notify the required-period-of-time measurement unit 202 and the table entry selection unit 203 of the occurrence of access.

Then, after the required-period-of-time measurement unit 202 is notified of the occurrence of access by the cache miss observation unit 207, the required-period-of-time measurement unit 202 starts to measure a required period of time (Step S52).

Moreover, after the table entry selection unit 203 is notified of the occurrence of access by the cache miss observation unit 207, the table entry selection unit 203 uses an address value of address information the table entry selection unit 203 has been notified of to make a selection as to which table entry result of the required-period-of-time table holding unit 301 to update (Step S53).

Meanwhile, the cache miss observation unit 207 continues monitoring the completion of a cache miss access to the bus caused by a cache miss (Step S54: No). When the cache miss access to the bus ends as a result (Step S54: Yes), the cache miss observation unit 207 uses the internal cache miss access completion notification unit 212 to notify the required-period-of-time measurement unit 202 of the completion of access.

After the required-period-of-time measurement unit 202 is notified of the completion of access by the cache miss observation unit 207; the required-period-of-time measurement unit 202 stops measuring the required period of time (Step S55).

Finally, the required-period-of-time measurement unit 202 updates the table entry of the required-period-of-time table holding unit 301; the cache miss observation unit 207 updates the table entry of the internal number-of-accesses table holding unit 302 using the internal number-of-accesses table updating unit 213 (Steps S56 and 57). The table entry to be updated is the one selected by the table entry selection unit 203.

Incidentally, as for the selection of a table entry at step S53, the selection can be made regardless of the order illustrated as long as the selection is performed during a period from when the access is detected at step S51 to when the required-period-of-time table is updated at step S56.

As for the updating of the number-of-accesses table at step S57, if the table entry has already been selected, the updating can be done after the access is detected at step S51 regardless of the order illustrated.

The following describes the advantageous effects of the present example.

In the present example, the configuration enables the number-of-accesses table holding unit 302 to hold the number of accesses for each of the classification regions. Therefore, in combination with required-period-of-time information of each region held by the required-period-of-time table holding unit 301, it is possible to identify the average required period of time of access for each classification region.

Example 6

The following describes in detail Example 6 of the present invention.

Figure 11:
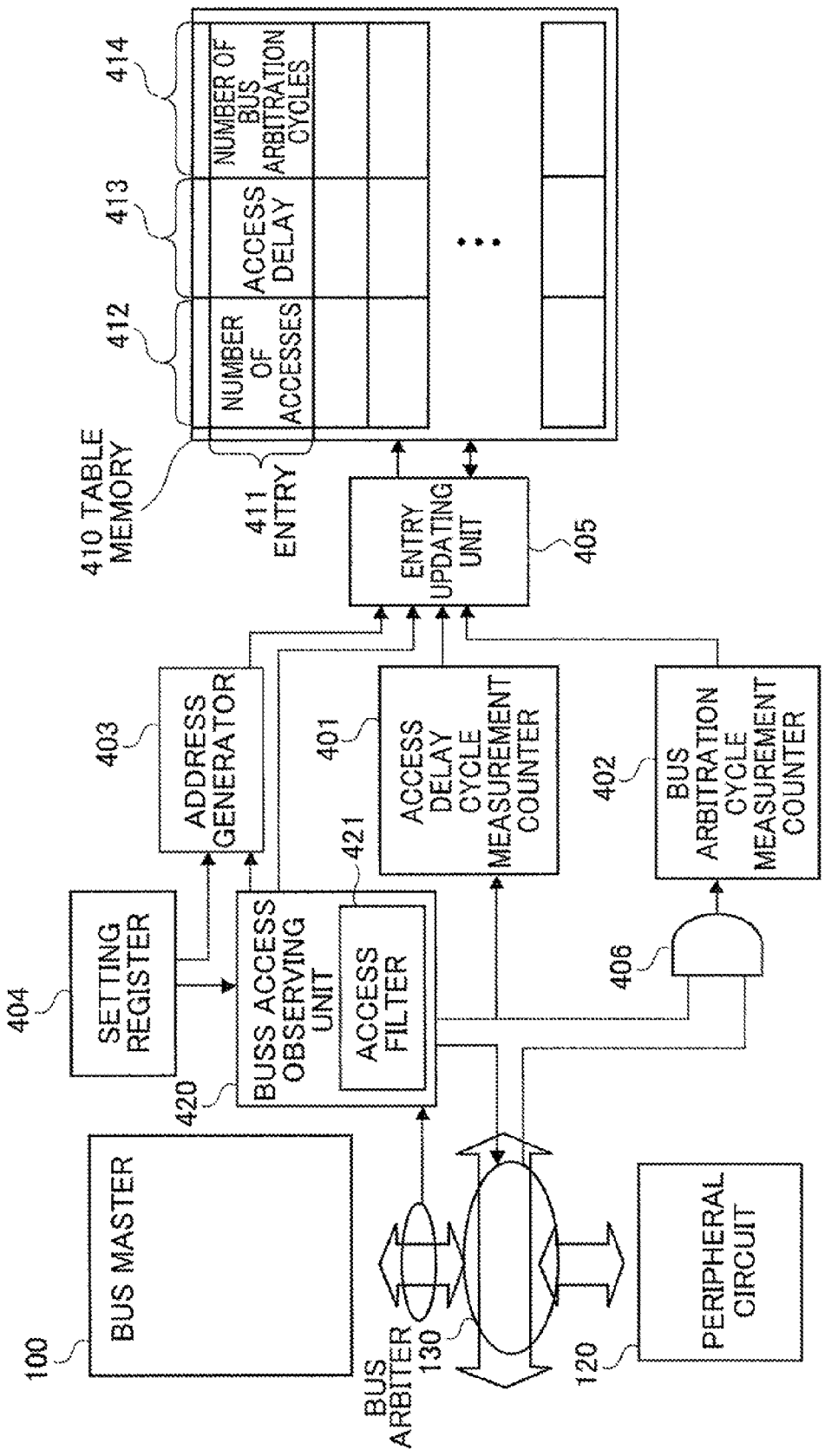
FIG. 11 A block diagram illustrating the configuration of a performance optimization system according to Example 6 of the present invention.

As shown in FIG. 11, in the present example, a performance optimization system is connected to a bus master 100 and peripheral circuit 120 positioned outside a MPU core, a cache memory and the like. The performance optimization system includes an access delay cycle measurement counter 401, a bus arbitration cycle measurement counter 402, an address generator 403, a setting register 404, an entry updating unit 405, an AND circuit 406, a table memory 410, and a buss access observing unit 420.

The table memory 410 holds a table that is made up of a plurality of entries (table entries) 411 including a number-of-accesses holding section 412, an access delay holding section 413 and a number-of-bus-arbitration-cycles holding section 414.

The buss access observing unit 420 includes an access filter 421 that narrows down target accesses. The buss access observing unit 420 receives signals from a point of observation of the bus and signals concerning settings from the setting register 404. In accordance with the settings the buss access observing unit 420 is notified of by the setting register 404, the buss access observing unit 420 conducts observation on the basis of the signals from the point of observation of the bus. At this time, if the setting register 404 is set so that the to-be-observed accesses should be narrowed down, the access filter 421 narrows down.

The buss access observing unit 420 issues a to-be-observed access detection notification and a to-be-observed access completion notification to the access delay cycle measurement counter 401, the bus arbitration cycle measurement counter 402, the entry updating unit 405 and the AND circuit 406. Therefore, a to-be-observed access detection/completion notification signal is so designed as to be at H-level when the to-be-observed access is occurring; detection and notification are conducted by changing the signals from L-level to H-level, and completion notification is conducted by changing the signals from H-level to L-level. When the to-be-observed bus access is detected, the address generator 403 is notified of an address value of the to-be-observed access, an access type concerning whether the access is for writing or reading, the duration of burst access and the like, an access ID, and the like.

There is a bus that employs a system in which a plurality of accesses overlaps. When such an bus is to be observed, the buss access observing unit 420 has to be able to handle a case in which a plurality of bus accesses overlaps.

Incidentally, in the present example, what is described is an example of a single bus master 100 for simplicity of explanation. However, the configuration can be easily expanded to observe a plurality of bus masters; it is desirable that the expanded configuration be a subject.

The access delay cycle measurement counter 401 receives a start notification and completion notification of the to-be-observed bus access from the buss access observing unit 420. In the present example, the buss access observing unit 420 is so configured as to output the to-be-observed access detection/completion notification signal at H-level when the to-be-observed access is occurring. The access delay cycle measurement counter 401 counts the number of cycles for a period during which the signals from the buss access observing unit 420 are at H-level. When the signals from the buss access observing unit 420 change from H-level to L-level, the access delay cycle measurement counter 401 stops counting and notifies the entry updating unit 405 of a measured value.

There is a bus that employs a system in which a plurality of accesses overlaps. When such an bus is to be observed, the access delay cycle measurement counter 401 needs a plurality of counters to handle a case in which a plurality of bus accesses overlaps.

The bus arbitration cycle measurement counter 402 receives a bus arbitration detection notification and completion notification from the AND circuit 406. In the present example, the AND circuit 406 is so configured as to output signals at H-level if the to-be-observed bus master 100 is forced to wait due to arbitration when the to-be-observed access is occurring. The bus arbitration cycle measurement counter 402 counts the number of cycles for a period during which the signals from the AND circuits 406 are at H-level. When the signals from the AND circuits 406 change from H-level to L-level, the bus arbitration cycle measurement counter 402 stops counting and notifies the entry updating unit 405 of a measured value.

There is a bus that employs a system in which a plurality of accesses overlaps. When such an bus is to be observed, the bus arbitration cycle measurement counter 402 needs a plurality of counters to handle a case in which a plurality of bus accesses overlaps.

The address generator 403 receives from the buss access observing unit 420 an address value of the to-be-observed access, an access type concerning whether the access is for writing or reading, the duration of burst access and the like, an access ID, and the like. The address generator 403 uses the information to calculate an address of the table memory 410 in which an entry for storing the measurement result is stored and notifies the entry updating unit of the address.

The setting register 404 holds the setting of the to-be-observed of the buss access observing unit 420, the setting of operations, the setting of the operation of the address generator 403 and the like and notifies the buss access observing unit 420 and the address generator 403 of the settings.

The entry updating unit 405 is notified of the detection and completion of the to-be-observed access from the buss access observing unit 420, of the measured values from the access delay cycle measurement counter 401 and the bus arbitration cycle measurement counter 402, and of the address of the table memory 410 from the address generator 403.

The entry updating unit 405 is equipped with a function of updating the entry 411 on the table memory 410. The updating starts at a time when the entry updating unit 405 is notified of the completion of the to-be-observed access. The notification is made by detecting that the to-be-observed access detection/completion notification signal from the buss access observing unit 420 changes from H-level to L-level. After being notified of the completion of the access, the entry updating unit 405 reads out a value of the to-be-updated entry 411 on the table memory 410 on the basis of the address the entry updating unit 405 has been notified of from the address generator 403.

In this case, the entry 411 includes the number-of-accesses holding section 412, the access delay holding section 413 and the number-of-bus-arbitration-cycles holding section 414. The entry updating unit 405 adds 1 to a value of the number-of-accesses holding section 412, the measured value the entry updating unit 405 has been notified of from the access delay cycle measurement counter 401 to a value of the access delay holding section 413, and the measured value the entry updating unit 405 has been notified of from the bus arbitration cycle measurement counter 402 to a value of the number-of-bus-arbitration-cycles holding section 414. After the additions, the entry updating unit 405 writes the values back to the to-be-updated entry 411 on the table memory 410.

The AND circuit 406 receives the to-be-observed access detection/completion notification signal from the buss access observing unit 420 and an arbitration waiting signal of the to-be-observed bus master 100 from a bus arbiter 130. In this case, the bus arbiter 130 is so configured as to output signals at H-level when the to-be-observed bus master 100 is waiting due to arbitration. According to the configuration of the present example, H-level is associated with the situation where the to-be-observed access is occurring, and H-level is associated with the situation where the to-be-observed bus master is waiting due to arbitration. If the to-be-observed bus master 100 is forced to wait due to arbitration at a time when the to-be-observed access is occurring, H-level signals are output to the bus arbitration cycle measurement counter.

Figure 12:
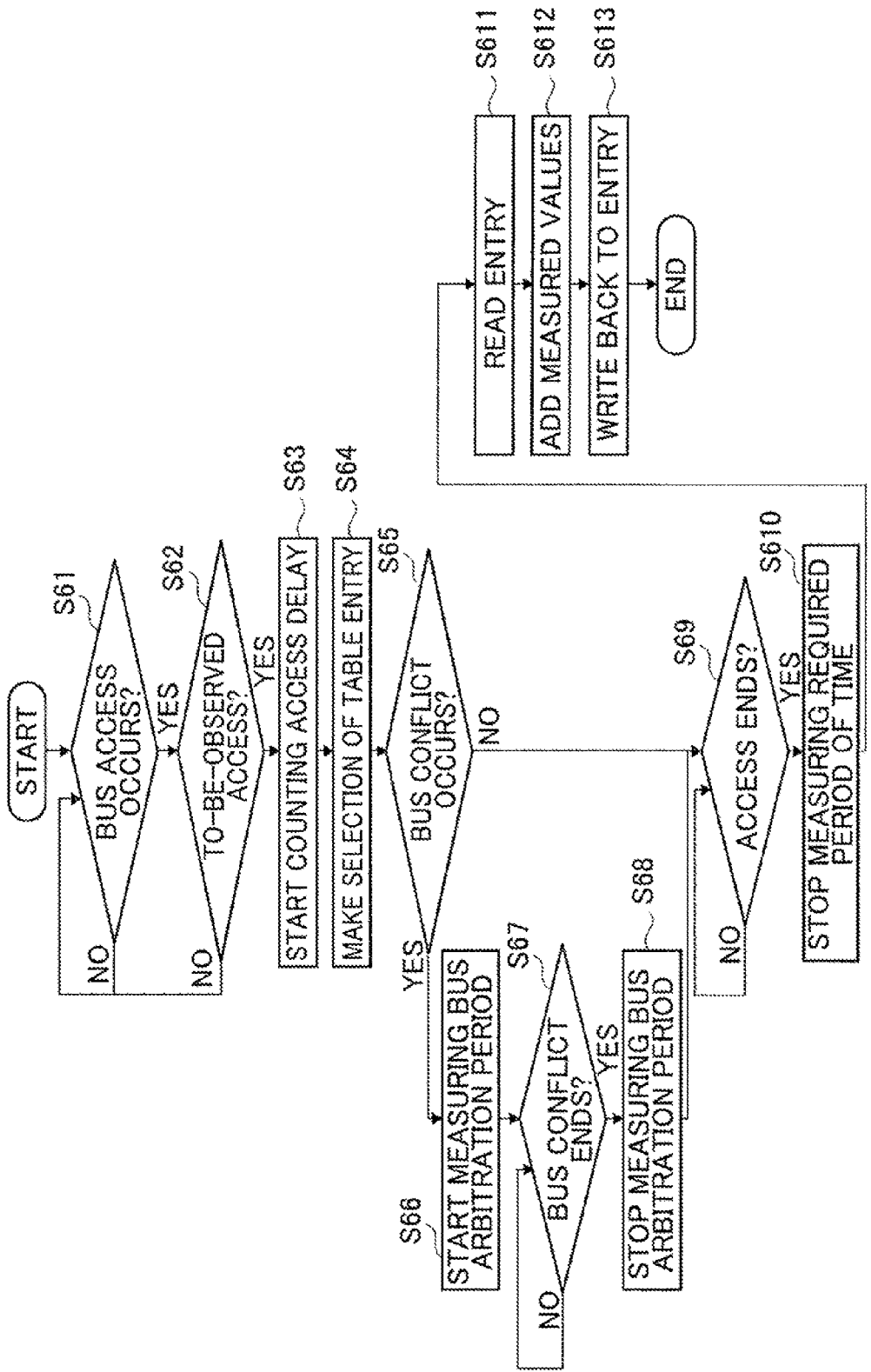
FIG. 12 A flowchart illustrating the operation of the performance optimization system according to Example 6.
Figure 13:
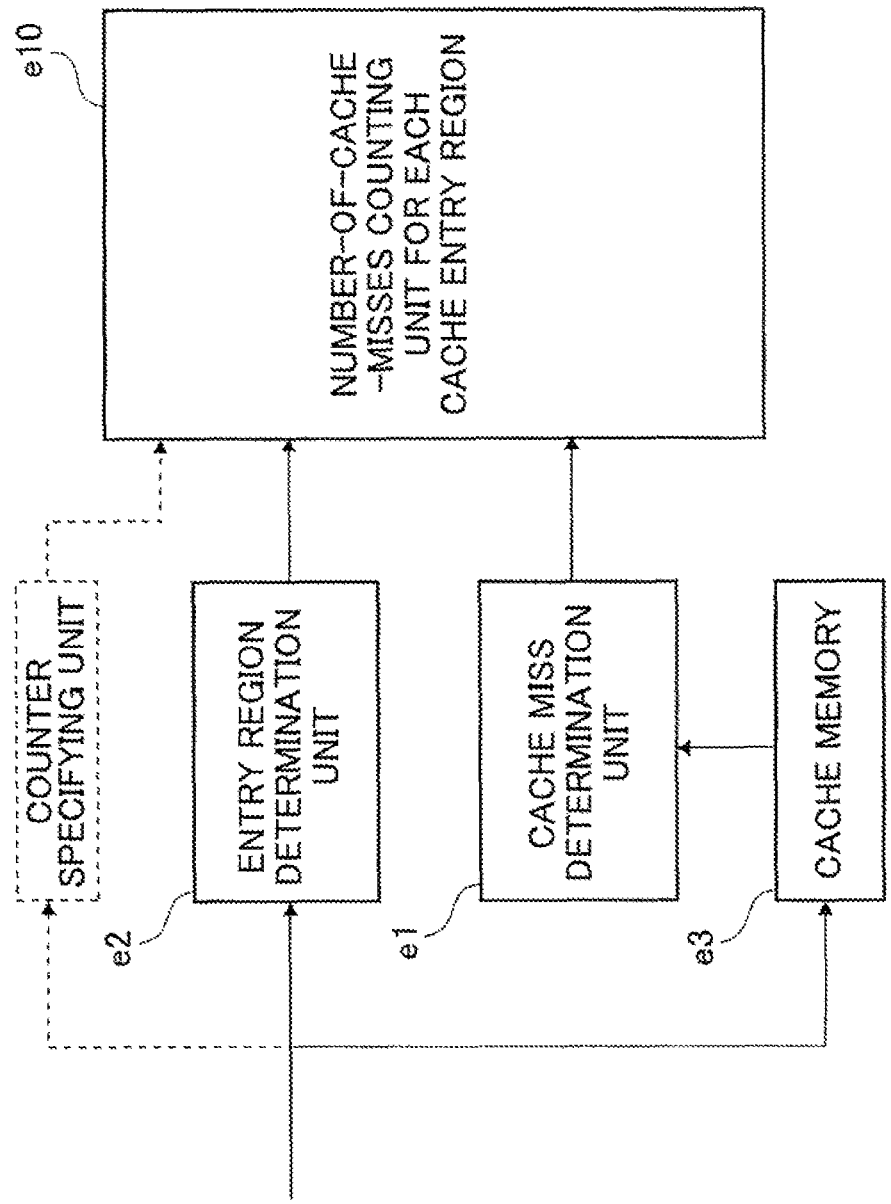
FIG. 13 A block diagram illustrating the configuration of a performance optimization system disclosed in PTL 1.

The following describes the operation of the present example with reference to a flowchart in FIG. 12. Incidentally, as for the present flowchart, an exemplary operational order is extracted. However, in reality, each element of the performance optimization system of the present example works independently as described above. Therefore, the steps are not necessarily performed in the order of the present flowchart and may be performed in different order.

First, the buss access observing unit 420 continuously observes the occurrence of access to the bus (Step S61: No). When the access is detected (Step S61: Yes), the buss access observing unit 420 starts to sort out by means of the internal access filter 421.

The access filter 421 makes a determination as to whether the detected bus access satisfies an arbitrary condition specified by the setting register 404 by using, out of the detected bus access information, information about an address value, an access type concerning whether the access is for writing or reading, the duration of burst access and the like, an access ID, and the like. When the detected buss access does not satisfy the condition (Step S62: No), the process returns to the detecting of the next bus access. When the detected buss access satisfies the condition (Step S62: Yes), the buss access observing unit 420 notifies the access delay cycle measurement counter 401, the address generator 403, the entry updating unit 405 and the AND circuit 406 of the fact that the satisfying access has occurred as an access occurrence notification (In this case, it does not make sense to notify the entry updating unit 405).

The notification is made by changing the to-be-observed access detection/completion notification signal from L-level to H-level. At the same time, the address generator 403 is notified of an address value of the to-be-observed access, an access type concerning whether the access is for writing or reading, the duration of burst access and the like, an access ID, and the like.

Then, the access delay cycle measurement counter 401 starts counting in response to the access occurrence notification from the buss access observing unit 420 because the access delay cycle measurement counter 401 is so configured as to count the number of cycles when the to-be-observed access detection/completion notification signal is at H-level (Step S63).

After receiving the access occurrence notification from the buss access observing unit 420, the address generator 403 uses one or a combination of the following factors the address generator 403 has been at the same time notified of to calculate an address of the table memory 410 in which an entry for storing the measurement result is stored and then notifies the entry updating unit 405 (Step S64): an address value of the buss access information, an access type concerning whether the access is for writing or reading, the duration of burst access and the like, an access ID, and the like.

At this time, the to-be-observed access detection/completion notification signal is input at H-level to one of the input terminals of the AND circuit 406.

The bus arbiter 130 is so configured as to output signals at H-level when the to-be-observed bus master 100 is waiting due to arbitration. Therefore, when there is no latency of arbitration resulting from a bus conflict in the to-be-observed access, one of the inputs to the AND circuit 406 is at L-level and a L-level signal is output to the bus arbitration cycle measurement counter 402.

In this case, the bus arbitration cycle measurement counter 402 proceeds to step S69 without doing anything (Step S65: No). When a latency of arbitration occurs due to a bus conflict in the to-be-observed access (Step S65: Yes), the two inputs to the AND circuit 406 are at H-level. Accordingly, a H-level signal is input to the bus arbitration cycle measurement counter 402, which then starts measuring a bus arbitration period (Step S66).

Then, the bus arbitration cycle measurement counter 402 continues measuring the bus arbitration period as long as the input from the AND circuit 406 is at H-level (Step S67: No). After the latency of bus arbitration of the to-be-observed access comes to an end, the signal from the bus arbiter 130 to the AND circuit 406 turns out to be at L-level and the AND circuit 406 outputs a L-level signal (Step S67: Yes). After the signal from the AND circuit 406 turns out to be at L-level, the bus arbitration cycle measurement counter 402 stops measuring (Step S67: Yes) and notifies the entry updating unit 405 of a measured value (Step S68).

The buss access observing unit 420 continues observing the completion of the bus access (Step S69: No). When the bus access ends as a result (Step S69: Yes), the buss access observing unit 420 sets the to-be-observed access detection/completion notification signal at L-level to notify the access delay cycle measurement counter 401, the address generator 403, the entry updating unit 405 and the AND circuit 406 of the completion of access (In this case, it does not make sense to notify the address generator 403 and the AND circuit 406).

After the access ends and the to-be-observed access detection/completion notification signal becomes L-level, the access delay cycle measurement counter 401 stops measuring a required period of time (Step S69: Yes) and notifies the entry updating unit 405 of a measured value (Step S610).

When the entry updating unit 405 is notified of the completion of access by the to-be-observed access detection/completion notification signal from the buss access observing unit 420 that has changed from H-level to L-level, the entry updating unit 405 then reads out a value of the to-be-updated entry 411 on the table memory 410 on the basis of an address the entry updating unit 405 has been notified of by the address generator 403 (Step S611).

In this case, the to-be-updated entry 411 includes the number-of-accesses holding section 412, the access delay holding section 413 and the number-of-bus-arbitration-cycles holding section 414. For the to-be-updated entry 411, the entry updating unit 405 adds 1 to a value of the number-of-accesses holding section 412, the measured value the entry updating unit 405 has been notified of from the access delay cycle measurement counter 401 to a value of the access delay holding section 413, and the measured value the entry updating unit 405 has been notified of from the bus arbitration cycle measurement counter 402 to a value of the number-of-bus-arbitration-cycles holding section 414 (Step S612). After the additions, the entry updating unit 405 writes the values back to the to-be-updated entry 411 on the table memory 410 (Step S613).

The following describes an application of the observation method of the present example.

For a combination of a specific processor and bus, a unique bus access called "WRAP burst" occurs on the bus in a cache miss access from the processor. For the WRAP burst, a transfer system that allows n data items to be transferred is adopted with the following procedure: when n successive data items are transferred, the transfer process starts with the mth arbitrary data item when 1≤m≤n, and, after the nth data item is transferred, the process returns to the first and continues until the m−1th data item is transferred. Another feature is that the duration of burst access is so set that the number of data items to be transferred can fill a cache line.

Accordingly, by using a method of updating different entries depending on the duration of burst access for WRAP burst in the address generator 403 in accordance with the settings of the setting register 404 or similarly using a method of narrowing down to an appropriate access to observe by means of the access filter 421 in the buss access observing unit 420 in accordance with the settings of the setting register 404, it is possible to separate cache miss accesses for observation.

Incidentally, in the performance optimization system in each of the above examples, as long as each process (function) of the above-described components can be realized, the physical configuration of the system and the hardware (circuits) and software (programs) in the system are not limited to specific forms. Any forms, including the following examples, are applicable: forming independent, separate circuits, units or program components (program modules or the like), and integrating all functions into one circuit or unit. Any of the forms can be selected appropriately depending on requirements concerning the function and usage of an actually used system or the like.

A performance optimization method for performing similar processes that includes processing steps each corresponding to each of the functions of the above-described components is also within the scope of the present invention.

At least a part of a process in each of the functions of the above-described components may be realized by software processing of a computer such as a processor containing a CPU (Central Processing Unit). In this case, a program (performance optimization program) for causing a computer to function is within the scope of the present invention. The program is not limited to a program of a type that can be directly executed by the CPU. The program may be a program in source form, a compressed program, an encrypted program or any other program. The program may be provided in any of the following forms: an application program that runs in concert with an OS (Operating system), which takes overall control of the system, and a control program such as firmware or is incorporated as a part of the OS or control program to operate integrally, software components (software modules) that make up the OS or control program, and the like. When being installed on a system having a communication function to communicate with an external device via a wireless or wired line, the program may be downloaded from an external node such as a server connected to the line and then installed on a recording medium in a local system for use. Any of the above forms can be selected appropriately depending on requirements concerning the function and usage of an actually used system or the like.

A computer-readable recording medium on which the above computer program is recorded is also within the scope of the present invention. In this case, for the recording medium, any of the following forms is applicable: a memory, such as ROM (Read Only Memory), or any other medium that is set in a system, a portable medium that a user can carry, and the like.

While the invention has been particularly shown and described with reference to exemplary embodiments and examples thereof, the invention is not limited to these embodiments and examples. It will be understood by those of ordinary skill in the art that various changes in form and details may be made therein without departing from the sprit and scope of the present invention as defined by the claims.

This application is the National Phase of PCT/JP2009/ 052041, filed Feb. 6, 2009, which is based upon and claims the benefit of priority from Japanese patent application No. 2008-031728, filed on Feb. 13, 2008, the disclosure of which is incorporated herein in its entirety by reference.

INDUSTRIAL APPLICABILITY

The present invention can be applied to observing cache misses to collect information for optimizing performance. The present invention can be also applied to observing a plurality of conflicting bus masters to collect information for optimizing performance.

The invention claimed is:

1. A performance optimization method comprising the steps of:
   detecting the occurrence of a cache miss access associated with a to-be-observed access;
   starting to measure a required period of time concerning the access;
   selecting a table entry from a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID (identifier);
   detecting the completion of the cache miss access;
   stopping the measurement of the required period of time concerning the access; and
   updating the selected table entry, out of a plurality of table entries that make up the required-period-of-time table, with the use of a value of a number of accesses and the measured value of the required period of time from when the cache miss access occurs until the cache miss access ends.

2. The performance optimization method according to claim 1, further comprising the steps of:
   detecting the occurrence of a bus conflict;
   starting to measure a bus arbitration period;
   selecting a table entry from a bus arbitration period table that consists of a plurality of table entries, in each table entry the measured values of the bus arbitration period being stored for each of the classification regions;
   detecting the end of the bus conflict;
   stopping the measurement of the bus arbitration period; and
   updating the selected table entry, out of a plurality of table entries that make up the bus arbitration period table, with the use of a measured value of the bus arbitration period from when the bus conflict occurs until the bus conflict ends.

3. The performance optimization method according to claim 1, further comprising the step of:
   determining whether a detected access meets a specified arbitrary condition.

4. A computer-readable medium stored therein a performance optimization program that causes a computer to execute:
   a process of detecting the occurrence of a cache miss access associated with a to-be-observed access;
   a process of starting to measure a required period of time concerning the access;
   a process of selecting a table entry from a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID (identifier);
   a process of detecting the completion of the cache miss access;
   a process of stopping the measurement of the required period of time concerning the access; and
   a process of updating the selected table entry, out of a plurality of table entries that make up the required-period-of-time table, with the use of a value of a number of accesses and the measured value of the required period of time from when the cache miss access occurs until the cache miss access ends.

5. The computer-readable medium according to claim 4 that causes a computer to further execute:
   a process of detecting the occurrence of a bus conflict;
   a process of starting to measure a bus arbitration period;
   a process of selecting a table entry from a bus arbitration period table that consists of a plurality of table entries, in each table entry the measured values of the bus arbitration period being stored for each of the classification regions;
   a process of detecting the end of the bus conflict;
   a process of stopping the measurement of the bus arbitration period; and
   a process of updating the selected table entry, out of a plurality of table entries that make up the bus arbitration period table, with the use of a measured value of the bus arbitration period from when the bus conflict occurs until the bus conflict ends.

6. The computer-readable medium according to claim 4 that causes a computer to further execute
- a process of determining whether a detected access meets a specified arbitrary condition.

7. A performance optimization system comprising:
- a required-period-of-time measurement unit configured to measure a required period of time concerning a to-be-observed access;
- a required-period-of-time table holding unit configured to hold a required-period-of-time table that consists of a plurality of table entries, in each table entry a value of a number of accesses and the measured value of the required period of time being stored for each of classification regions of a memory to be accessed, the each of classification regions being defined corresponding to each group of accesses obtained by classifying the to-be-observed access according to a combination of an address value, an access type and an access ID (identifier);
- a table entry selection unit configured to select, on the basis of the to-be-observed access, among the plurality of table entries a table entry in which the measured value of the number of accesses and the measured value of the required period of time are stored; and
- a cache miss observation unit that detects the occurrence of a cache miss associated with the to-be-observed access.

8. The performance optimization system according to claim 7, wherein
- the cache miss observation unit comprises:
  - a cache miss occurrence notification unit configured to notify of the occurrence of the cache miss; and
  - a cache miss access completion notification unit configured to notify of the completion of a cache miss access to a bus caused by the cache miss.

9. The performance optimization system according to claim 7, further comprising
- an access type determination unit configured to determine the type of the to-be-observed access and to select and detect a specific access.

10. The performance optimization system according to claim 7, further comprising:
- a bus arbitration observation unit configured to detect that access is forced to wait due to arbitration for an access conflict with a bus master other than the to-be-observed;
- a bus arbitration period measurement unit configured to measure a period concerning bus arbitration; and
- a bus arbitration period table holding unit configured to store a bus arbitration period table that consists of a plurality of table entries, in each table entry in the measured values of the period concerning the bus arbitration being stored for each of the classification regions.

* * * * *